(12) United States Patent
Embley

(10) Patent No.: US 9,725,253 B2
(45) Date of Patent: Aug. 8, 2017

(54) MATERIAL HANDLING SYSTEM WITH QUEUE CHUTE

(71) Applicant: PRECISION AIRCONVEY CORPORATION, Newark, DE (US)

(72) Inventor: Thomas C. Embley, Landenberg, PA (US)

(73) Assignee: Precision Airconvey Corporation, Newark, DE (US)

(*) Notice: Subject to any disclaimer, the term of this patent is extended or adjusted under 35 U.S.C. 154(b) by 0 days.

(21) Appl. No.: 15/387,063

(22) Filed: Dec. 21, 2016

(65) Prior Publication Data

US 2017/0101275 A1   Apr. 13, 2017

Related U.S. Application Data

(63) Continuation of application No. 14/873,664, filed on Oct. 2, 2015, now abandoned.

(60) Provisional application No. 62/058,964, filed on Oct. 2, 2014.

(51) Int. Cl.
| | |
|---|---|
| *B65G 11/20* | (2006.01) |
| *B65G 11/02* | (2006.01) |
| *B65G 51/02* | (2006.01) |
| *E04F 17/12* | (2006.01) |
| *E05F 15/73* | (2015.01) |

(52) U.S. Cl.
CPC ............ *B65G 51/02* (2013.01); *B65G 11/023* (2013.01); *B65G 11/203* (2013.01); *E04F 17/12* (2013.01); *E05F 15/73* (2015.01)

(58) Field of Classification Search
CPC ....... E04F 17/12; B65G 11/20; B65G 11/203; B65G 11/206; F23G 5/444

USPC .......................................................... 193/34
See application file for complete search history.

(56) References Cited

U.S. PATENT DOCUMENTS

| | | | |
|---|---|---|---|
| 3,651,912 | A | 3/1972 | Rohner |
| 3,980,166 | A | 9/1976 | De Feudis |
| 4,013,551 | A | 3/1977 | De Feudis |
| 4,111,315 | A | 9/1978 | Hungerbach |

(Continued)

FOREIGN PATENT DOCUMENTS

| | | |
|---|---|---|
| ES | 2208045 A1 | 6/2004 |
| WO | 2012/117146 A1 | 9/2012 |

OTHER PUBLICATIONS

International Search Report mailed Dec. 18, 2015 in corresponding International Patent Application No. PCT/US2015/053718.

*Primary Examiner* — Mark A Deuble
(74) *Attorney, Agent, or Firm* — Pepper Hamilton LLP

(57) ABSTRACT

A material handling system for the disposal of materials in multi-floor buildings. The material handling system has one or more main chutes each having one or more sets of loading stations, queue chutes, and gates. The queue chutes store material to be disposed, which is held back from entering into the main chute by the gate. The material is loaded into the queue chute via an opening in the loading station. The opening of the gates is controlled using a material handling system controller, which is controlled via a control panel or automatically using a timer or based upon the output of one or more level sensors that can determine the fullness of the queue chutes. The main chutes can have primary gates to allow for safe maintenance of the system. The loading stations can have secondary access to the main chutes.

20 Claims, 8 Drawing Sheets

(56) References Cited

U.S. PATENT DOCUMENTS

| | | |
|---|---|---|
| 5,090,546 A | 2/1992 | McDermott |
| 5,205,695 A | 4/1993 | Katsui |
| 5,253,766 A | 10/1993 | Sims |
| 5,314,127 A * | 5/1994 | Coulthard .......... B02C 18/2216 110/222 |
| 5,551,576 A | 9/1996 | Importico |
| 5,568,871 A | 10/1996 | Shantzis |

* cited by examiner

MATERIAL HANDLING SYSTEM WITH QUEUE CHUTE

This application is a continuation of U.S. patent application Ser. No. 14/873,664, entitled MATERIAL HANDLING SYSTEM WITH QUEUE CHUTE, filed on Oct. 2, 2015, which in turn claims priority to U.S. Provisional Patent Application Ser. No. 62/058,964, entitled QUEUE CHUTE, filed on Oct. 2, 2014. The entire contents of both applications are hereby incorporated by reference for any purpose.

TECHNOLOGY FIELD

The present application relates generally to a queuing system for material handling systems using gravity-assisted or vacuum-assisted queue chutes.

BACKGROUND

Many high-rise or multi-story buildings utilize gravity-assisted or vacuum-assisted chute systems for the rapid disposal of trash, laundry, or other materials. Typically the user inserts a bag of materials, or the materials themselves, into the system on an upper floor, which then travels downwards until reaching an ejection point, usually located in a basement or lower level of the building. Generally, a system with the capacity to handle both trash and laundry will separate the two materials into separate systems to avoid contamination.

One conventional material handling system automates the transport of soiled hospital linens to reduce infection. Access to the system is granted via an access door mounted on a box, which is in turn mounted on and connected to a chute pulling a constant vacuum. Once a user loads materials and closes the outer door, a gate at the back of the box opens and the soiled laundry is immediately exposed to the suction force created by the vacuum system and swiftly disposed of. However, this conventional system has a variety of drawbacks.

First, because the user of the system can potentially be directly exposed to the suction force of the vacuum, any loose or unsecured items on the user's person or in the vicinity of the door are subject to being disposed of along with the laundry. Second, direct access to the vacuum tube results in unwanted removal of heated or cooled air from the building, adding to utility costs. Third, conventional vacuum systems are typically noisy and violent. Most importantly, conventional systems do not allow multiple users to access to the system simultaneously. Only one user at a time is allowed access due to a lack of enough power to evacuate multiple stations (which would result in laundry or trash sitting in the loading station and never entering the main chute). To prevent unwanted access, lockout mechanisms such as physical locks or keycard systems are installed on the loading stations.

SUMMARY

Embodiments can provide a material handling system that can comprise at least one material handling chute assembly, where each material handling chute assembly can comprise a main chute extending from an upper story to a lower story in a multi-floor building; one or more loading stations can each have an access opening and a bottom opening; one or more queue chutes can each comprise a substantially vertical section and a transition section, the vertical section can be connected at a first end to the bottom opening of one of the loading stations and the transition section can be connected at a second end to the main chute; and one or more gates can be positioned proximate the second end of the queue chute to selectively open and close an aperture between the queue chute and the main chute.

Embodiments can provide a material handling system where the main chute can further comprise a main chute output and a primary gate positioned between the main chute and the main chute output to selectively open and close an aperture between the main chute and the main chute output.

Embodiments can provide a material handling system where the transition section can be a curve, or the transition section can be joined to the vertical section at an angle.

Embodiments can provide a material handling system where each loading station further comprises a loading station access door for selectively providing access to the loading station.

Embodiments can provide a material handling system where one or more level sensors can be configured to determine the fullness of each queue chute. The level sensors can additionally determine a fullness time for each queue chute.

Embodiments can provide a material handling system where each loading station can be mounted to the main chute by one or more side struts.

Embodiments can provide a material handling system where a material handling system controller can be configured to actuate the one or more gates. Additionally, one or more level sensors can determine the fullness of each queue chute and the selective opening and closing of the one or more gates can be automatically determined by an output of the level sensors. The level sensors can also determine a fullness time for each queue chute.

Embodiments can provide a material handling system with one or more additional material handling chute assemblies.

Embodiments can provide a material handling system with two or more material handling chute assemblies, where each material handling chute assembly can comprise a main chute extending from an upper story to a lower story in a multi-floor building; one or more loading stations can each have an access opening and a bottom opening; one or more queue chutes can each comprise a substantially vertical section and a transition section, the vertical section can be connected at a first end to the bottom opening of one of the loading stations and the transition section can be connected at a second end to the main chute; and one or more gates can be positioned proximate the second end of the queue chute to selectively open and close an aperture between the queue chute and the main chute.

Embodiments can provide a material handling system with two or more material handling chute assemblies where each main chute can further comprise a main chute output and a primary gate positioned between the main chute and the main chute output to selectively open and close an aperture between the main chute and the main chute output. Each main chute can terminate at an independently selected location.

Embodiments can provide a material handling system with two or more material handling chute assemblies where the transition section can be a curve or where the transition section can be joined to the vertical section at an angle.

Embodiments can provide a material handling system with two or more material handling chute assemblies where each loading station can further comprise a loading station access door for selectively providing access to the loading station.

Embodiments can provide a material handling system with two or more material handling chute assemblies where one or more level sensors can be configured to determine the fullness of each queue chute. The one or more level sensors can also determine a fullness time for each queue chute.

Embodiments can provide a material handling system with two or more material handling chute assemblies where each loading station can be mounted to the main chute by one or more side struts.

Embodiments can provide a material handling system with two or more material handling chute assemblies where a material handling system controller can be configured to actuate the one or more gates. Additionally, one or more level sensors can determine the fullness of each queue chute; and the selective opening and closing of the one or more gates can be automatically determined by an output of the level sensors. The one or more level sensors can also determine a fullness time for each queue chute.

Embodiments can provide a method of creating a material handling system in an existing material handling system having a main chute and one or more loading stations connected to the main chute, which can comprise cutting an opening into the bottom of each of the loading stations; for each loading station, cutting a main chute access opening into the main chute, below the loading station; and mounting a queue chute having a vertical section and a transition section between each loading station opening and main chute access opening.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
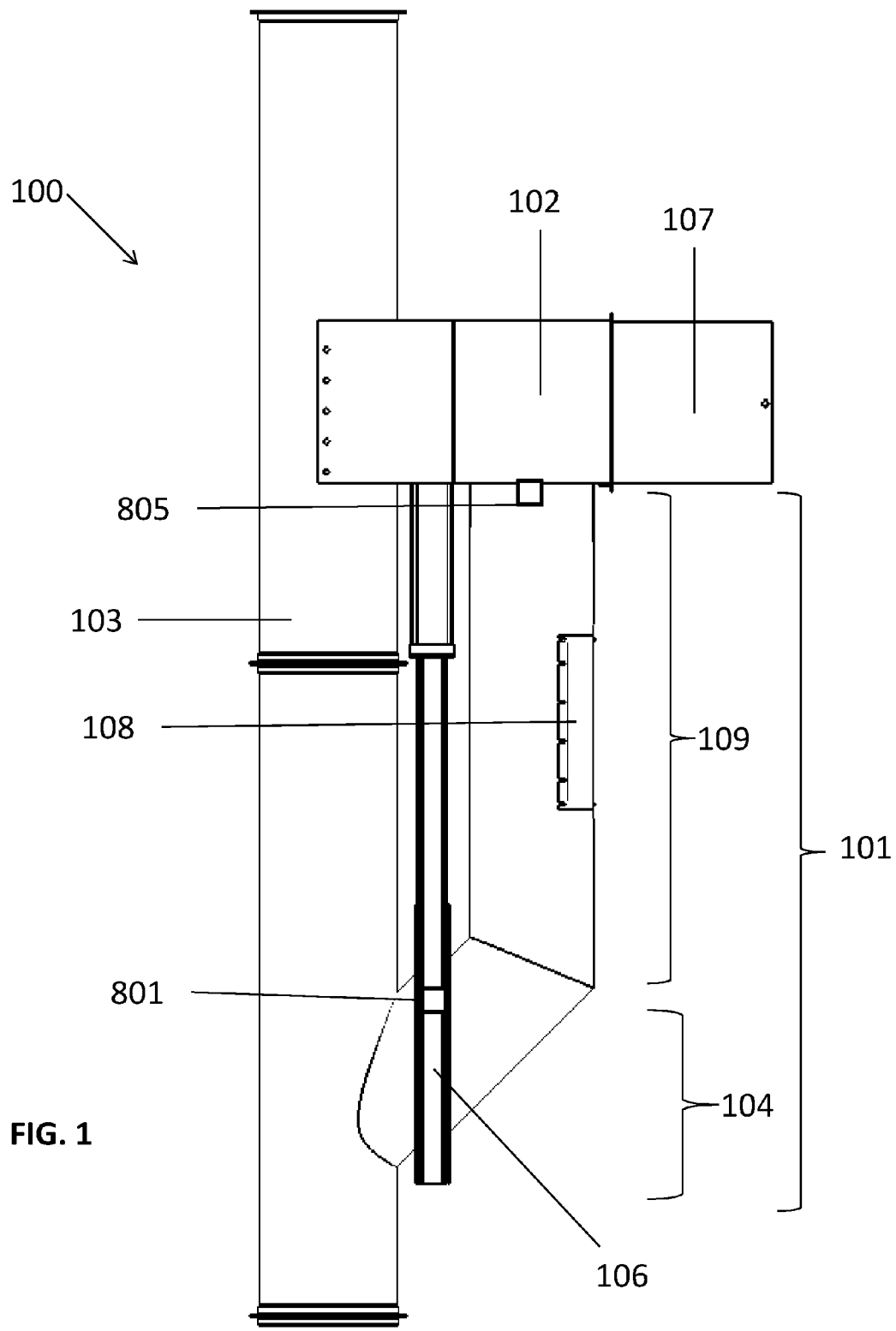
FIG. 1 is a side view of a material handling system with queue chute according to an embodiment disclosed herein.

The material handling system according to embodiments of the present invention solves one or more of the problems associated with conventional material handling systems by providing a queue chute in addition to the primary or main chute. A queue chute can be in addition to, and separate from, the main chute, and can provide an area where disposal materials (such as, but not limited to, laundry and/or trash) can accumulate and wait prior to entry into the main chute. A material handling system that utilizes a queue chute can result in more efficient material handling and reduced costs of operation.

A queue chute can be integrated at the location of each loading station, which can be, but is not limited to, a box. In one embodiment, the queue chute can connect to an opening in the bottom of the loading station and can extend vertically downward from the loading station. The queue chute can connect to the main chute at a predetermined distance below the loading station. The length and diameter of the queue chute can determine the amount of material that can be contained within the queue chute prior to the queue chute being opened to the main chute for evacuation. In an embodiment, the queue chute can be sized to receive and hold the contents of an entire trash or laundry bin, roll around tub, or similar sized container.

In contrast to a conventional material handling system having a direct horizontal connection between the loading station and the main chute, the present material handling system includes one or more queue chutes, wherein each queue chute can include a loading station mounted to a main chute by side struts, with an opening in the bottom of the loading station that can connect the queue chute to the loading station. When a user accesses the loading station via an access mechanism (e.g., door), the material to be disposed can be dropped straight down (e.g., vertically) into the queue chute. The queue chute can terminate at a gate that can grant or deny access to the main chute. The gate can connect to the main chute at a location below the loading station. The gate can be opened independently of the loading station access door or in conjunction with its opening.

As the queue chute and the main chute can each have a substantial diameter, the queue chute can, after extending vertically down, segment into a transition section to intersect with the main chute. In an embodiment, the transition section may be an angled section. In another embodiment, the transition section may be a gentle curve instead of an angle to prevent the back-up of material transitioning from the vertical section of the queue chute to the main chute via the transition section.

The gate connecting the queue chute with the main chute can be activated pneumatically, magnetically, mechanically, or by other known actuating means. The gate can be directed to partially open in order to control the flow of material entering the main chute. The gate aperture can be any shape. In an embodiment, the gate can slide open in a vertical direction. In an alternate embodiment, the gate can slide open in a horizontal direction. In an embodiment, the gate can be a hinged design and may pivot about the hinge to open. In an embodiment, the gate can be comprised of one or more doors, which can open independently or in tandem.

In an embodiment, the user can fill the queue chute by loading material into the loading station, which can then drop into the queue chute through the opening in the loading station. While loading, the material can be prevented from entering the main chute by the gate located at the connection point between the queue chute and the main chute. When the user has finished filling the queue chute through the loading station, the user can close the loading station and actuate the opening of the gate through an external control panel. In an alternate embodiment, the opening of the gate can be automated through the use of a timer or by the inclusion of one or more sensors that can detect queue chute fullness by weight or proximity. In an embodiment, the gate can open, allowing the material to enter the main chute. In an alternate embodiment using a vacuum system, the opening of the gate can also trigger the activation of the vacuum system to aid drawing the material into the main chute. Alternately, the vacuum system can constantly remain on.

In an embodiment, the queue chute can be the only way to access the main chute. In an alternate embodiment, secondary access can additionally be provided horizontally through the back of the loading station, as in conventional systems. The dual-access system can provide back-up access or a bypass for maintenance, repairs, removing clogs, or other necessary actions.

In an embodiment, each floor of a multi-floor building can have its own loading station and queue chute connecting to the main chute through a gate. As users on each floor deposit material in their respective loading stations and queue chutes, a material handling system controller can determine the proper gate opening sequence to maximize the efficiency of the material handling system and to prevent clogs or congestion in the main chute. Additionally, the main chute can have a primary gate located near the base of the material handling system for the safe service and maintenance of the main chute. The primary gate, when closed, can prevent the draw of the vacuum while the chutes are being accessed.

In an embodiment, a material handling system can have multiple main chutes for the disposal of more than one type of material. For example, a material handling system can have a trash chute and a laundry chute. Both the trash chute and the laundry chute can have their own queue chutes and loading stations located on each floor of a multi-floor building. In an alternate embodiment, a material handling system for a facility having more than one multi-floor building can have multiple main chutes in each building, each with their own queue chutes and loading stations located on each floor. The main chutes can converge in various combinations in the basement or lower floors of the facility. Each set of main chutes can include primary gates to allow safe service and maintenance of the system.

In an embodiment, one or more sensors can be used to sense how much material is currently held in each queue chute. A "full" reading can indicate when the queue chute is unable to accept more material and must be evacuated. Sensors may utilize sonic, optical, weight, or mechanical mechanisms to determine the amount of material currently held in each queue chute. Additional sensors can be used to determine if a gate and/or loading station access door is currently open. A controller can monitor and control the overall operation of the material handling system, designating which gates open, to what degree, and at what time. For instance, in a material handling system designed for trash and recyclables, the control system can be used to increase efficiency in separating trash from recyclables by utilizing a transactional approach wherein the user designates the type of material loaded at the time of loading, which allows the control system to determine when the load of materials should be released based on whether trash or recyclables are currently being collected at the material handling system output.

Creation of the present material handling system can be accomplished by augmenting an existing system having a main chute with queue chutes and loading stations. The present material handling system can fit within the footprint of conventional systems, and does not require additional space or substantial renovation. Modification of an existing system can add a queue chute and vertical access to a pre-existing loading station that originally opened horizontally into the main chute. The added queue chute can then be connected to the existing main chute in the same manner as described above.

Advantages of the present material handling system arise from the isolation of the main chute, which can be constantly drawing a vacuum, from the queue chute and loading station, and by proxy the user loading material into the loading station. The present system can prevent energy waste by strategically opening and closing the gates when the loading stations are closed, thus prohibiting excess air-conditioned or heated air from escaping the building via the main chute. Additionally, automation of a multi-floor material handling system can enable users to prioritize the order of materials to be disposed. For example, some materials may need to be disposed of as quickly as possible, while others can be allowed to remain in the queue chutes for longer while the priority materials are first disposed of Allowing multiple users on different floors access to the system simultaneously saves time and labor by allowing an individual user to deposit a load of material into a loading station and return to work, without having to wait for access if another user uses the system at the same time.

FIG. 1 is a side view of a material handling system 100 with queue chute 101 according to an embodiment. A queue chute 101 can be integrated at the location of each loading station 102, which can be, but is not limited to, a box. The queue chute 101 can have a vertical section 109 that can connect to an opening (not shown) in the bottom of the loading station 102 and can extend vertically downward from the loading station 102. The queue chute 102 can connect to a main chute 103 at a predetermined distance below the loading station 102. The length and diameter of the queue chute 101 can determine the amount of material that can be contained within the queue chute 101 prior to the queue chute 101 being opened to the main chute 103 for evacuation. In an embodiment, the queue chute 101 can be large enough to receive and hold the contents of an entire trash or laundry bin, roll around tub, or similar sized container (not shown). In an embodiment, the queue chute 101 can have a lesser diameter than the main chute 103. In an embodiment, the queue chute 101 can have a greater diameter than the main chute 103. In an embodiment, the queue chute 101 can have a diameter equal to the main chute 103. In an embodiment, the queue chute 101 can have a volume of 11,550 to 37,700 cubic inches able to be loaded with material. While the embodiment shown in the figures shows the main chute 103 and the queue chute 101 as having a cylindrical geometry, alternate embodiments allow for rectangular, triangular, polygonal, or a combination of geometries for the main chute 103, the queue chute 101, or both.

The queue chute 101 can, after extending substantially vertically down in the vertical section 109, segment into a transition section 104 to intersect with the main chute 103. Substantially vertical can allow for the vertical section to be angled within five degrees of being perfectly vertical to accommodate alternate floor layouts. In an embodiment, the transition section 104 can be joined to the vertical section 109 at an angle from about 65 degrees to about 90 degrees, inclusive, with respect to the vertical. In an embodiment, the transition section 104 can be joined to the vertical section 109 at an angle from about 65 degrees to about 85 degrees, inclusive, with respect to the vertical. In an embodiment, the transition section 104 can be joined to the vertical section 109 at an angle from about 65 degrees to about 80 degrees, inclusive, with respect to the vertical. In an embodiment, the transition section 104 can be joined to the vertical section 109 at an angle from about 65 degrees to about 75 degrees, inclusive, with respect to the vertical. In an embodiment, the transition section 104 and the vertical section 109 may be a gentle curve instead of an angle to prevent back-up of material transitioning from the vertical section 109 of the queue chute 101 to the main chute 103 via the transition section 104. The queue chute can have a maintenance door 108 located above the transition section 104 that can provide access to the queue chute 101 in the event of a clog, or for maintenance of the material handling system components.

When a user accesses the queue chute 101, the material to be disposed can be dropped straight down (e.g., vertically) into the queue chute 101 through the opening in the loading station 102. The queue chute 101 can terminate at a gate 106 that can grant or deny access to the main chute 103. In an embodiment, the gate 106 can be positioned proximate to the end of the queue chute 101 as close as possible to the main chute 103, allowing for the maximum amount of material storage space inside the queue chute 101. In an embodiment, the gate 106 can be positioned at the juncture of the vertical section 109 and the transition section 104. The gate 106 can connect the queue chute 101 to the main chute 103 at a location below the loading station 102. The gate 106 can be opened independently of the loading station access door 107 or in conjunction with its opening. In an embodiment, the user can fill the queue chute 101 by loading material into the loading station 102, which can then drop into the queue chute 101. While loading, the material can be prevented from entering the main chute 103 by the gate 106 located at the connection point between the queue chute 101 and the main chute 103. When the user has finished filling the queue chute 101 through the loading station 102, the user can close the loading station 102 and actuate the opening of the gate 106 through an external control panel (see for example FIG. 8). In an alternate embodiment, the opening of the gate 106 can be automated through a timer (see for example FIG. 8), by the inclusion of one or more level sensors 805 that can detect the amount of material loaded in the queue chute 101 based on weight or proximity, or by a remote material handling system controller (see for example FIG. 8). In an embodiment, the gate 106 can open, allowing the material to enter the main chute 103. A gate sensor 801 can detect whether the gate aperture is opened or closed. In an alternate embodiment using a vacuum system, the opening of the gate 106 can also trigger the activation of the vacuum system to aid drawing the material into the main chute 103. Alternately, the vacuum system can constantly remain on, with the queue chute 101 and loading station 102 remaining isolated from the draw of the vacuum by the gate 106 when closed.

Figure 2:
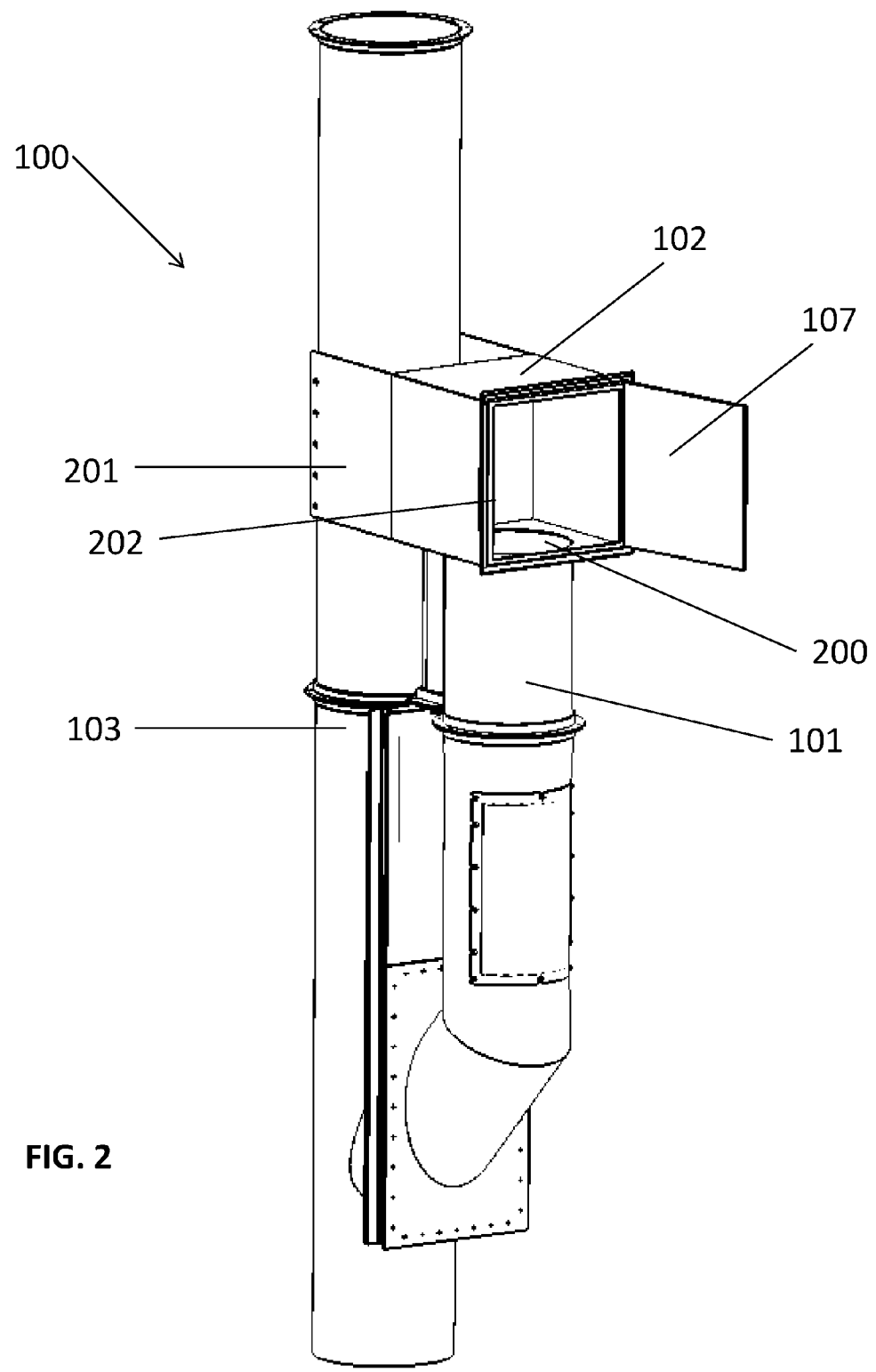
FIG. 2 is a perspective view of a material handling system with queue chute according to the exemplary embodiment of FIG. 1.

FIG. 2 is a perspective view of a material handling system 100 with queue chute 101. In contrast to a conventional material handling system with a direct horizontal connection between the loading station 102 and the main chute 103, the present system can have a queue chute 101 that can include a loading station 102 mounted to the main chute 103 by side struts 201, with an opening 200 in the bottom of the loading station 102 that can connect to the queue chute 101. Material can be loaded into the loading station 102 by inserting it through the access opening 202 of the loading station, and from there into the queue chute 101 through the bottom opening 200 connecting the queue chute 101 with the loading station 102. Access to the loading station can be prevented by a loading station access door 107.

Figure 3:
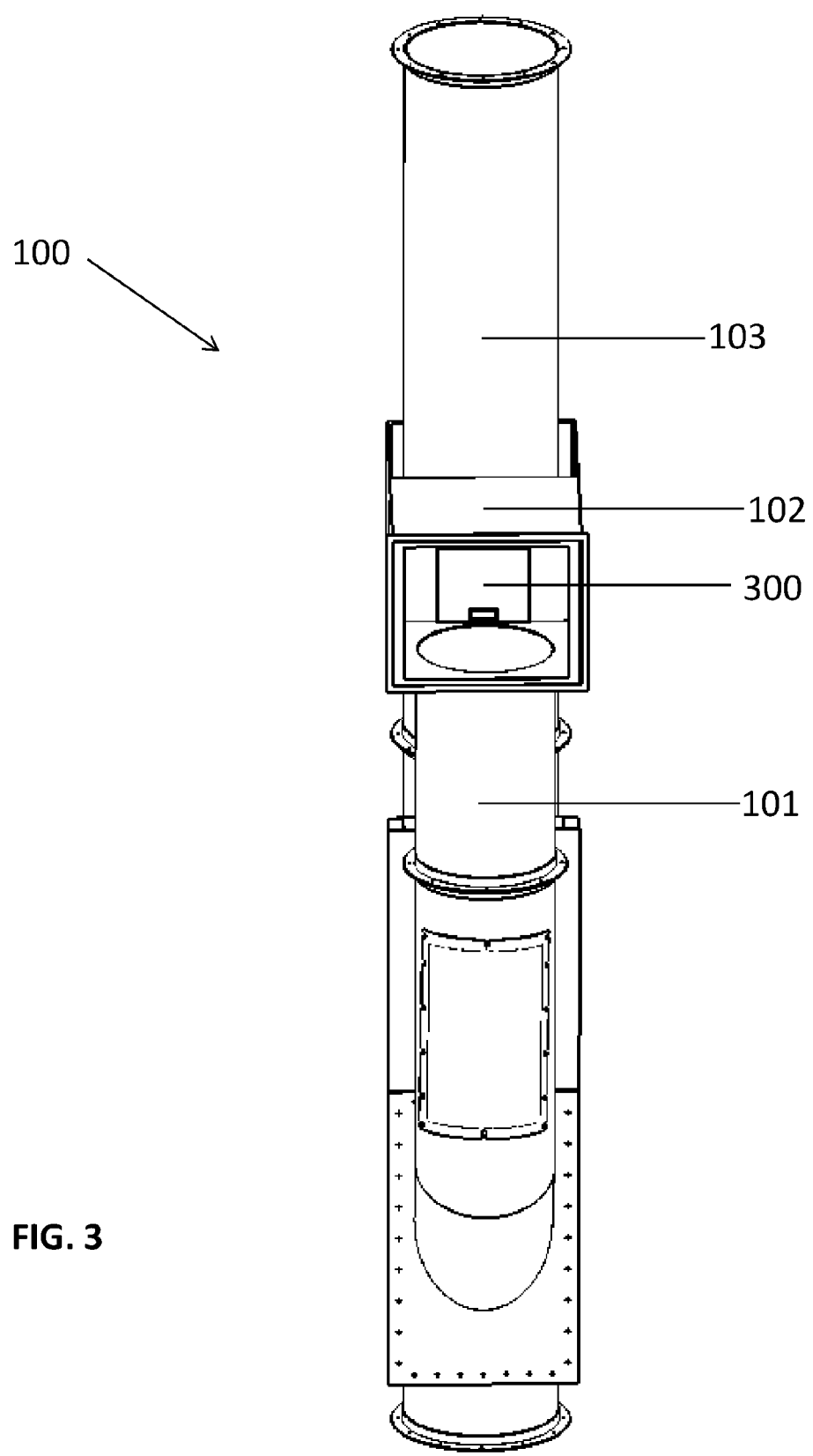
FIG. 3 is a front view of a material handling system with queue chute according to the exemplary embodiment of FIG. 1.

FIG. 3 is a front view of a material handling system 100 with queue chute 101. In an embodiment, the queue chute 101 can be the only way to access the main chute 103. In an alternate embodiment, a secondary access 300 can additionally be provided horizontally through the back of the loading station 102, similar to the access found in conventional systems. The secondary access 300 can be a sliding or hinged door that can be closed when not in use to prevent access into the main chute 103 through the loading station 102. The dual-access system can provide back-up access or a bypass for maintenance, repairs, removing clogs, or other necessary actions.

Figure 4:
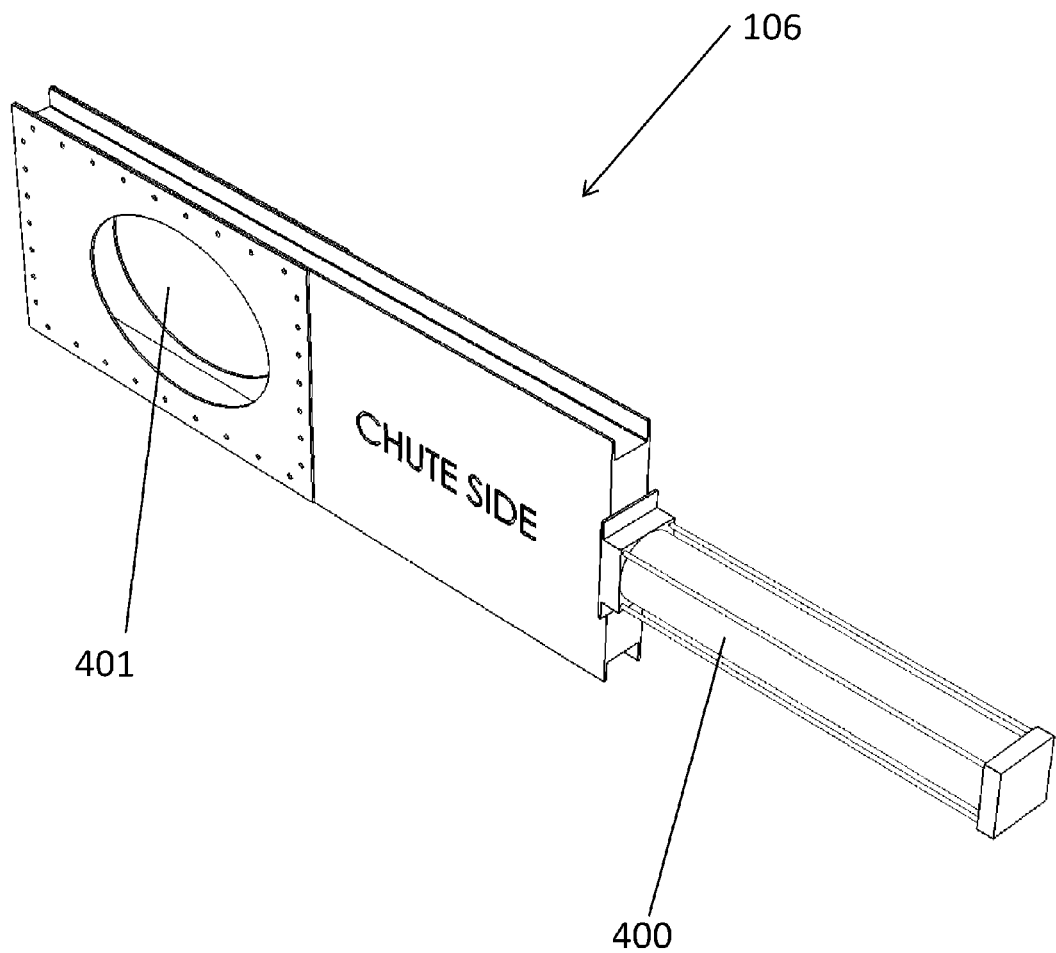
FIG. 4 is a perspective view of an exemplary gate.

FIG. 4 is a perspective view of an exemplary gate 106. The gate 106 connecting the queue chute 102 with the main chute 103 can be activated pneumatically, magnetically, mechanically, or by other known actuating means 400. The gate 106 can be directed to partially open in order to control the flow of material entering the main chute. The gate aperture 401 can be any shape. In an embodiment, the gate 106 can slide open in a vertical direction. In an alternate embodiment, the gate 106 can slide open in a horizontal direction. In an embodiment, the gate 106 can be comprised of one or more doors, which can open independently or in tandem. In an embodiment, the gate 106 can be a hinged design and may pivot about the hinge to open. The gate 106 can be controlled by an external control panel, by one or more sensors that determine queue chute 101 fullness, or by a remote material handling system controller.

Figure 5:
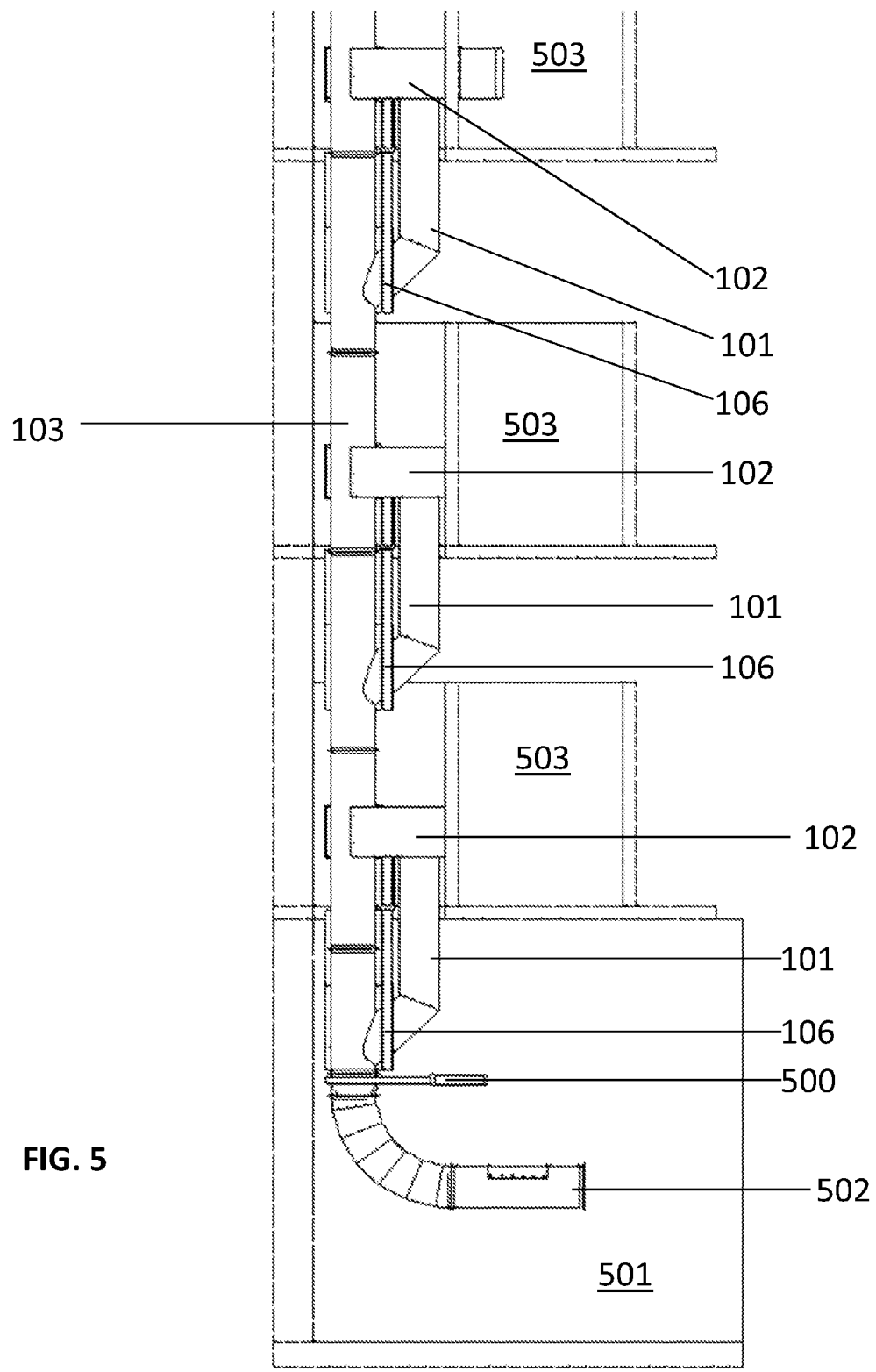
FIG. 5 is a side view of a multi-floor material handling system with queue chutes according to an embodiment disclosed herein.

FIG. 5 is a side view of an exemplary multi-floor material handling system with queue chutes 101. In an embodiment, each story 503 of a multi-floor building can have its own loading station 102 and queue chute 101 connecting to the main chute 103 through a gate 106. The main chute 103 can extend between upper stories 503 and can terminate in a main chute output 502, which can be located in the lowest story or basement 501 of the multi-floor building. As users on each story deposit material in their respective loading stations 102 and queue chutes 101, a material handling system controller (see for example, FIG. 8) can determine the proper gate 106 opening sequence to maximize the efficiency of the material handling system 100 and to prevent clogs or congestion in the main chute 103. Additionally, the main chute 103 can have a primary gate 500 located near the output 502 of the material handling system 100 for the safe service and maintenance of the main chute 103, or, in systems with multiple main chutes, for directing where a vacuum force is applied. In an embodiment, the primary gate 500 can be generally left open to allow the passage of materials through the main chute 103 into the main chute output 502. In an embodiment, the primary gate 500 can be generally left closed to prevent unwanted vacuum and air flow, but can be opened prior to releasing material from the queue chute 106 into the main chute 103 through the gate 106. The primary gate 500 can have the same structural components as described in FIG. 4.

Figure 6:
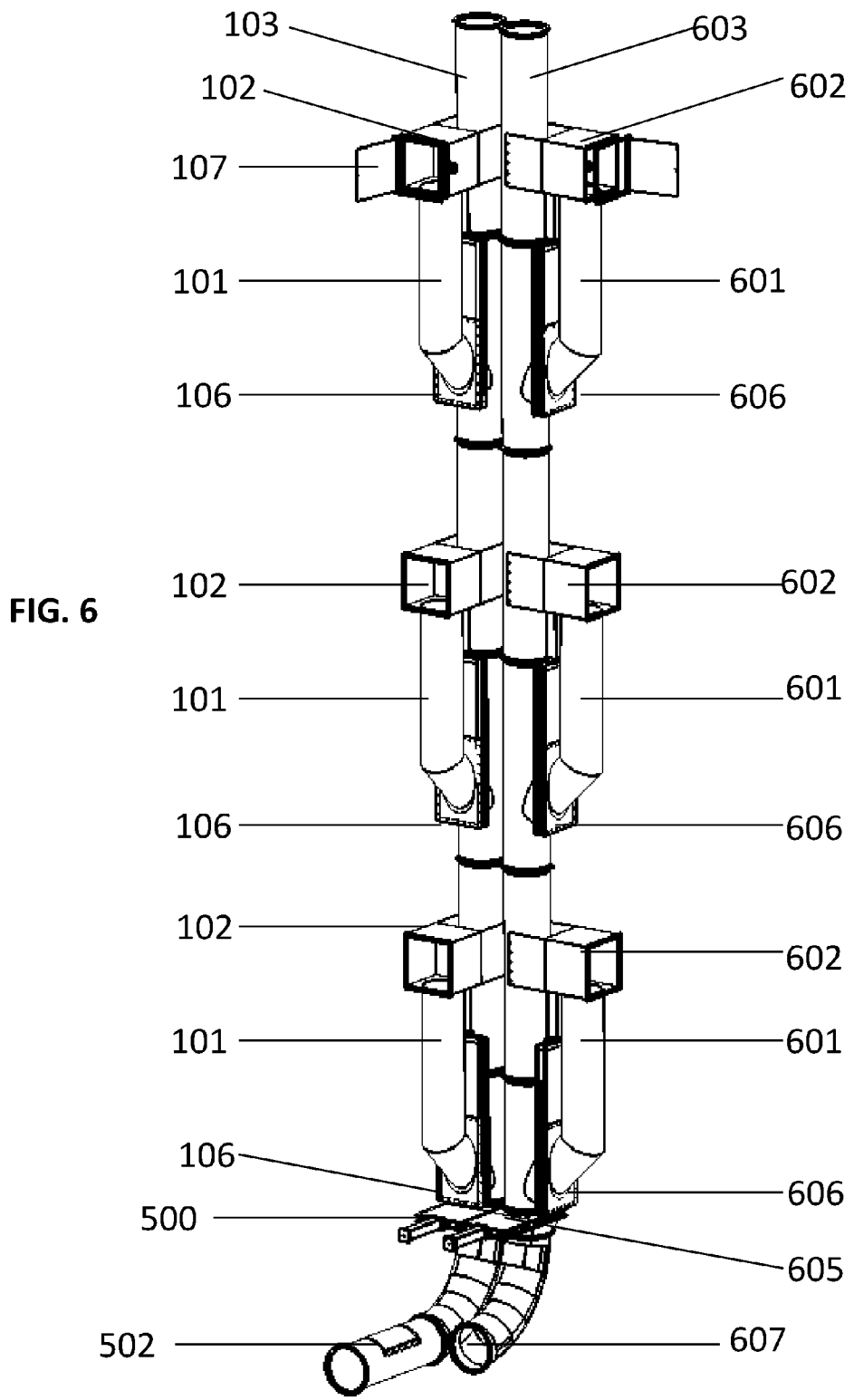
FIG. 6 is perspective view of a multi-floor material handling system having multiple main chutes each with queue chutes according to the exemplary embodiment of FIG. 5.

FIG. 6 is perspective view of a multi-floor material handling system 100 having a first main chute 103 and a second main chute 603, each with their own queue chutes 101, 601. In an embodiment, a material handling system can have multiple main chutes 103, 603 for the disposal of the same or more than one type of material. For example, a material handling system can have a first main chute 103 for disposing trash and a second main chute 603 for disposing laundry. Both the first main chute 103 and the second main chute 603 can have their own sets of queue chutes 101, 601, loading stations 102, 602, and gates 106, 606 located on each floor of a multi-floor building. The loading stations 102, 602 can each have a loading station access door 107, allowing access to the loading stations and, in some embodiments, preventing access to the loading stations 102, 602 if their corresponding gates 106, 606 are open. The first main chute 103 and the second main chute 603 can each have a main chute output 502, 607, which can be located, for example, in the lowest floor or basement of the multi-floor building; although basement locations are common, the main chute output may be located on any floor below the floor(s) being serviced by the material handling system. In embodiments having multiple material handling chute assemblies, each main chute may terminate at an independently selected location. For example, in a two chute assembly system, a trash chute assembly and a laundry chute assembly need not terminate at the same level (although they could); a trash chute assembly may terminate at street level, while a laundry chute assembly could terminate at the basement laundry. Additionally, the first main chute 103 and the second main chute 603 can each have a primary gate 500, 605. The primary gates 500, 605 can serve as barriers against a vacuum system 803 which can allow for the safe service and maintenance of the main chutes 103, 603. Additionally, the primary gates 500, 605 can direct the flow of the vacuum into one or all of the main chutes 103, 603, allowing for increased energy efficiency of the system by closing off areas not needing a vacuum and thus allowing the vacuum system 803 to operate at a lower capacity than would be required if both main chutes 103, 603 were left open at all times.

In an alternate embodiment, a material handling system for a facility having more than one multi-floor building can have one or multiple main chutes in each building, each with their own queue chutes and loading stations located on each floor. The main chutes can converge in various combinations in, for example, the basement or lower floors of the facility. A lateral can be provided where two branches of main chutes merge into one. This system works well when there is a common basement/lower floor for multiple buildings, for example for unified treatment of trash. Each set of main chutes can include primary gates to allow safe service and maintenance of the system, and to direct the flow of a vacuum force during selective evacuation of particular main chutes.

Figure 7:
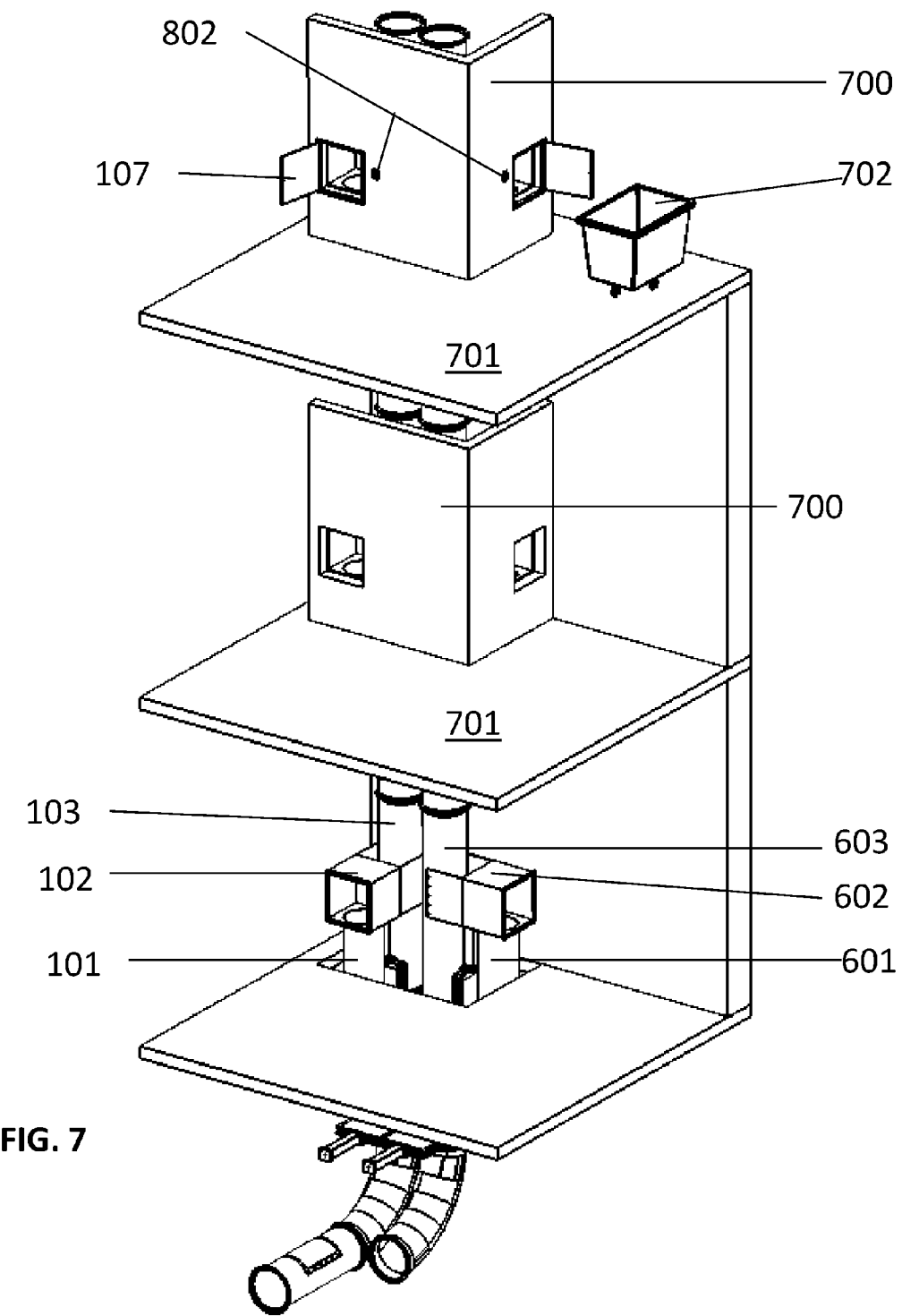
FIG. 7 is a perspective view of a multi-floor material handling system having multiple main chutes each with queue chutes according to the exemplary embodiment of FIG. 5.

FIG. 7 is a perspective view of a multi-floor material handling system having multiple main chutes 103, 603 each with their own queue chutes 101, 601. Each combination of main chute and associated queue chute(s) forms a material handling chute assembly. FIG. 7 depicts a system having two material handling chute assemblies, although a particular system could have any number of material handling chute assemblies. For safety and aesthetics, the bulk of the material handling system can be hidden from view by a wall 700 or other covering. The wall 700 can have one or more holes or openings allowing access to the loading stations 102, 602 or the loading station access doors 107. Access to the material handling system can be controlled by control panels 802 located adjacent to the loading station access doors 107. The loading stations 102, 602 can be located at a predetermined distance above the floor 701, while the queue chutes 101, 601 can extend and connect with the main chutes 103, 603 at a level below the floor 701. In an embodiment, each queue chute 101, 601 is of sufficient length and diameter to admit the contents of an entire waste or laundry bin 702.

Figure 8:
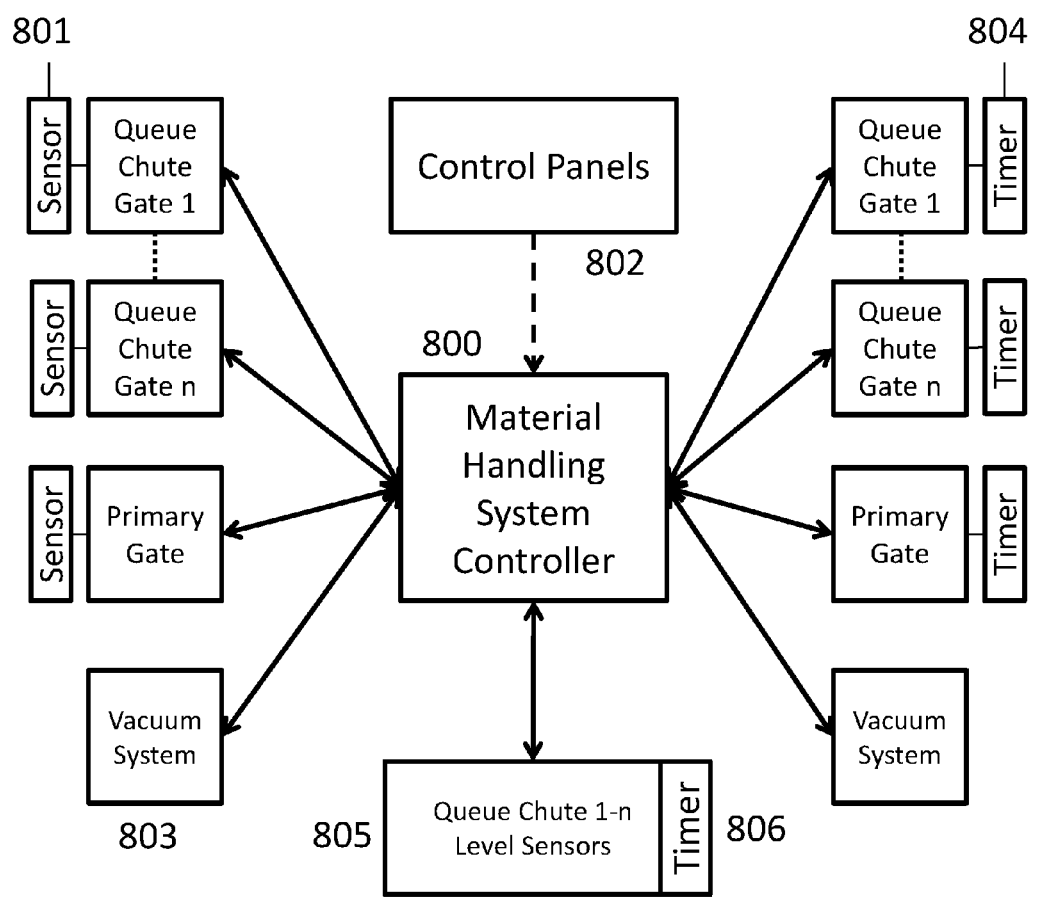
FIG. 8 is a functional block diagram of a material handling system controller according to an embodiment disclosed herein.

FIG. 8 is a functional block diagram of a material handling system controller 800 according to an embodiment disclosed herein. In an embodiment, one or more level sensors 805 can be used to sense how much material is currently held in each queue chute 101. A "full" reading can indicate when the queue chute 101 is unable to accept more material and should be evacuated. Likewise, gate sensors 801 can determine if there is a blockage or obstruction near the primary gate or the queue chute gates. Additional gate sensors 801 can be used to determine if a gate and/or loading station access door 107 is currently open. In another embodiment, the level sensors 805 can include a level timer 806 that tracks how long material (e.g., trash) has been in each queue chute 101 and can activate evacuation of the particular queue chute 101 after the material has been in the queue chute 101 for a certain period of time (e.g., a fullness time). Sensors 801, 805 may utilize sonic, optical, weight, or mechanical mechanisms to determine the amount of material currently held in each queue chute 101. The material handling controller 800 can monitor and control the overall operation of the material handling system, designating which gates open to what degree and at what time. Additionally, the material handling controller 800 can activate or deactivate the vacuum system 803 of each main chute, if present. The controller 800 can act in a preprogrammed fashion, or can act at the direction of one or more control panels 802 which can be located in proximity to a loading station or at a central control facility. Alternatively, the queue chute gates and primary gates can open automatically at the control of gate timers 804 that can have preset intervals programmed for activation of the gates. The controller 800 can open as few or as many gates, including primary gates, as desired or required by the system.

In an embodiment, the material handling system controller 800 can trigger the queue chute gates in a cascade to minimize clogs in the system. In an instance where the various sensors report that queue chutes 1 through n are full (with queue chute 1 being located at the top-most floor and queue chute n being located at the floor above the lowest floor), the controller 800 can first open queue chute gate n and allow the bottom queue chute to empty into the main chute. Once empty, the controller 800 can close queue chute gate n, open queue chute gate n−1, allow queue chute n−1 to empty, close queue chute n−1, and repeat the process for each queue chute gate until queue chute gate 1 has been opened and queue chute 1 evacuated. Alternatively, the controller 800 can invert the opening process and begin by opening queue chute gate 1, proceeding down the chain of gates until queue chute n is evacuated.

In an alternate embodiment involving a material handling system having a single main chute designated for trash and recyclables, the controller 800 can be used to increase efficiency in separating trash from recyclables by utilizing a transactional approach, wherein the user designates on a control panel 802 the type of material loaded into the particular queue chute 101 at the time of loading, which allows the controller 800 to determine when the load of materials should be released based on whether trash or recyclables are currently being collected at the material handling system output.

A conventional material handling system, having loading stations feeding into a main chute, can be converted (retrofit) into the present material handling system without significant restructuring of an existing floor plan. A bottom opening can be cut into the bottom of each loading station, onto which can be fitted a queue chute. Main chute access openings can be cut into the main chute, and the queue chutes can be fitted onto the main chute access openings through the use of the gates.

Although the invention has been described with reference to exemplary embodiments, it is not limited thereto. Those skilled in the art will appreciate that numerous changes and modifications may be made to an embodiments of the invention and that such changes and modifications may be made without departing from the true spirit of the invention.

What is claimed is:

1. A material handling system, comprising:
at least one material handling chute assembly, each material handling chute assembly comprising:
a main chute extending from an upper story to a lower story in a multi-floor building;
one or more loading stations each having an access opening and a bottom opening;
one or more queue chutes each comprising a substantially vertical section and a transition section, the vertical section connected at a first end to the bottom opening of one of the loading stations and the transition section connected at a second end to the main chute;
one or more gates positioned proximate the second end of the queue chute to selectively open and close an aperture between the queue chute and the main chute;
a material handling system controller configured to actuate the one or more gates;
one or more level sensors configured to determine the fullness of each queue chute;
the selective opening and closing of the one or more gates being automatically determined by the controller using an output of the level sensors;
a vacuum system attached to the main chute;
wherein the vacuum system activation is triggered by the activation of the one or more gates.

2. The material handling system as recited in claim 1, wherein:
the main chute further comprises a main chute output and a primary gate positioned between the main chute and the main chute output to selectively open and close an aperture between the main chute and the main chute output.

3. The material handling system as recited in claim 1, wherein:
each loading station further comprises a loading station access door for selectively providing access to the loading station.

4. The material handling system as recited in claim 1, further comprising:
one or more additional sensors to determine if any of the access doors are currently open.

5. The material handling system as recited in claim 1, wherein:
the one or more level sensors are further configured to determine a fullness time for each queue chute.

6. The material handling system as recited in claim 1, wherein:
each loading station is mounted to the main chute by one or more side struts.

7. The material handling system as recited in claim 1, further comprising:
one or more additional material handling chute assemblies.

8. The material handling system as recited in claim 7, wherein:
each of the one or more additional material handling chute assemblies is designed to dispose of more than one type of material.

9. A material handling system, comprising:
two or more material handling chute assemblies, each material handling chute assembly comprising:
a main chute extending from an upper story to a lower story in a multi-floor building;
one or more loading stations each having an access opening and a bottom opening;
one or more queue chutes each comprising a substantially vertical section and a transition section, the vertical section connected at a first end to the bottom opening of one of the loading stations and the transition section connected at a second end to the main chute;
one or more gates positioned proximate the second end of the queue chute to selectively open and close an aperture between the queue chute and the main chute;
a material handling system controller configured to actuate the one or more gates;
one or more level sensors configured to determine the fullness of each queue chute;
the selective opening and closing of the one or more gates being automatically determined by an output of the level sensors;
a vacuum system attached to each main chute;
wherein the vacuum system activation is triggered by the activation of the one or more gates.

10. The material handling system as recited in claim 9, wherein:
each main chute each further comprises a main chute output and a primary gate positioned between the main chute and the main chute output to selectively open and close an aperture between the main chute and the main chute output.

11. The material handling system as recited in claim 9, wherein:
one of the two or more material handling chute assemblies can be designed for trash and another of the two or more material handling chute assemblies can be designed for recyclables;
the material handling system controller receives information from a user designating a type of material at loading such that the system can determine whether a load of trash or recyclables should be released by the particular material handling chute assembly.

12. The material handling system as recited in claim 9, wherein:
each main chute of the two or more material handling chute assemblies terminates at an independently selected location.

13. The material handling system as recited in claim 9, wherein:
each loading station further comprises a loading station access door for selectively providing access to the loading station and an additional sensor to determine if the loading station access door is currently open.

14. The material handling system as recited in claim 9, wherein:
the one or more level sensors are further configured to determine a fullness time for each queue chute.

15. A material handling system, comprising:
two or more material handling chute assemblies, each material handling chute assembly comprising:
- a main chute extending from an upper story to a lower story in a multi-floor building;
- one or more loading stations each having an access opening and a bottom opening;
- one or more queue chutes each comprising a substantially vertical section and a transition section, the vertical section connected at a first end to the bottom opening of one of the loading stations and the transition section connected at a second end to the main chute;
- one or more gates positioned proximate the second end of the queue chute to selectively open and close an aperture between the queue chute and the main chute;
- a material handling system controller configured to actuate the one or more gates, wherein the material handling system controller receives priority information from a user to prioritize the order of materials to be disposed;
- one or more level sensors configured to determine the fullness of each queue chute;
- the selective opening and closing of the one or more gates being automatically determined by an output of the level sensors.

16. The material handling system as recited in claim 15, wherein:
each main chute each further comprises a main chute output and a primary gate positioned between the main chute and the main chute output to selectively open and close an aperture between the main chute and the main chute output.

17. The material handling system as recited in claim 15, wherein:
- one of the two or more material handling chute assemblies can be designed for trash and another of the two or more material handling chute assemblies can be designed for recyclables;
- the material handling system controller receives information from the user designating a type of material at loading such that the system can determine whether a load of trash or recyclables should be released by the particular material handling chute assembly.

18. The material handling system as recited in claim 15, wherein:
each main chute of the two or more material handling chute assemblies terminates at an independently selected location.

19. The material handling system as recited in claim 15, wherein:
each loading station further comprises a loading station access door for selectively providing access to the loading station and an additional sensor to determine if the loading station access door is currently open.

20. The material handling system as recited in claim 15, wherein:
the one or more level sensors are further configured to determine a fullness time for each queue chute.

* * * * *